April 12, 1949.                P. M. BOWMAN                2,467,251
                              EYEGLASS HOLDER
                             Filed June 27, 1947
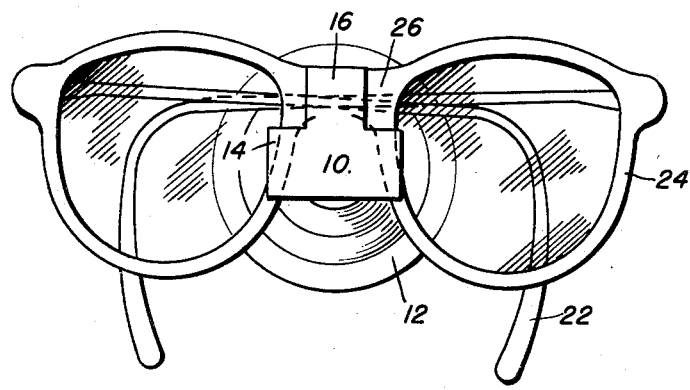
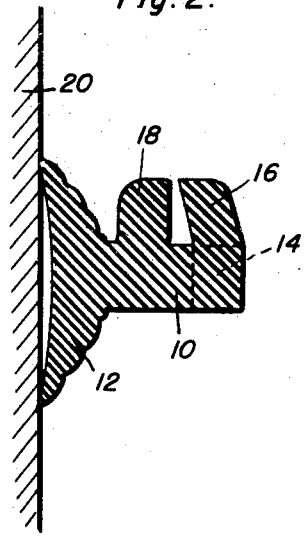
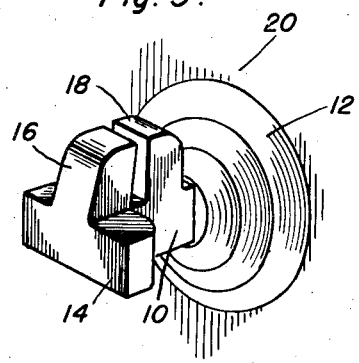
Inventor
Paul M. Bowman
By Clarence A. O'Brien
and Harvey B. Jackson
Attorneys Patented Apr. 12, 1949

2,467,251

UNITED STATES PATENT OFFICE 2,467,251

EYEGLASS HOLDER

Paul M. Bowman, St. Louis, Mo.

Application June 27, 1947, Serial No. 757,523

2 Claims. (Cl. 248—300)

This invention relates to new and useful improvements in eyeglass holders and the primary object of the present invention is to provide a holder that is quickly and readily attached to a convenient portion of a vehicle dashboard or the like to support eyeglasses in a safe easily accessible manner.

Another important object of the present invention is to provide a holder all parts of which, are preferably formed or molded in a single operation, thereby reducing the cost of manufacture for such a device.

A further object of the present invention is the provision of an eyeglass holder embodying novel and improved stop means preventing movement of the eyeglasses when in an engaged position with the holder.

A still further aim of the present invention is to provide an eyeglass holder that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view of a pair of eyeglasses supported by the present holder;

Figure 2 is a longitudinal vertical sectional view showing the present invention applied to a supporting surface; and Figure 3 is a perspective view showing the eyeglass holder applied to a supporting surface.

Referring now to the drawings in detail, wherein for the purpose of illustration, there is disclosed a preferred embodiment of the present invention, the numeral 10 represents a preferably rectangular base member of resilient material such as rubber or the like.

Integrally formed at one terminal portion of the base member 10 is a suction cup 12, and also integrally formed with the base member at the opposite end thereof is a pair of right angular extensions or stop members 14, that project outwardly from opposite sides of the base member. The function of the stop members will be more fully described in the use of the device.

Projecting outwardly from preferably the upper face of the base member, is a pair of opposed spaced resilient jaws 16 and 18 preferably integrally formed with the base member. The free terminal portion of one of these jaws, for example 16, converges toward the free terminal portion of the opposite jaw 18.

In practical use of the device, the suction cup 12 is attached to a suitable supporting member such as a dashboard or the like 20 at a convenient, easily accessible place thereon. The side pieces 22 of the eyeglasses 24 are folded inwardly upon each other. The nose piece 26 is then inserted between jaws 16 and 18 to be frictionally held in position thereto. The side pieces 22 rest between the base member 10 and the suction cup 12. Base 10 acts as a saddle for the two lenses of the eyeglass.

It should be noted, that the angular extensions 14 do not necessarily have to be shaped as disclosed. They may be square as well as round. The primary reason for this portion of the holder is to provide advertising space for those interested in using the holder as an advertising medium or gift. The pressure of jaws 16 and 18 on the nose piece of the glasses 24 is enough to hold the glasses in place. Extensions 14 should not be as thick as jaw 16 in case the extension is square or round, but should be somewhat thinner and should not follow the backward slant of jaw 16 but should be built upright from the base thus eliminating any pressure on the eyeglasses except at the nose piece.

Obviously, any other suitable fastening means may be employed other than the suction cup, whereby the device may be rigidly secured to a supporting surface without deviating from the scope of the present invention, however, it has been found that by the use of such a suction cup, the device may be applied to a vehicle dashboard so that the driver may easily insert the glasses in position to the holder or may quickly remove the glasses therefrom for instant use.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An eyeglass holder comprising an elongated base member having an inner end and an outer end, means for securing the inner end of the base member to a supporting surface with the longitudinal axis of the base member perpendicular to the supporting surface, an opposing pair of resilient jaws projecting outwardly from said base member, and stop means carried by one of said jaws for limiting the movement of a glass frame in one direction.

2. An eyeglass holder of latex material comprising an elongated base member substantially rectangular in form and including an inner end, an outer end and spaced longitudinal side faces, means for removably securing the base member to a supporting structure with the longitudinal axis of said base member disposed at right angles to the supporting structure, said base member including an upper face, a first inner jaw projecting upwardly from the upper face of said base member, a second outer jaw fixed to the upper face of the base member in spaced relation to and opposing the first jaw, and a pair of stop lugs fixed to the side faces of said base member and having inner bearing faces spaced parallel to the first jaw.

PAUL M. BOWMAN.

REFERENCES CITED

The following references are of record in the file of this patent:

UNITED STATES PATENTS

| Number | Name | Date |
|---|---|---|
| 547,470 | Zestermann | Oct. 8, 1895 |
| 1,575,789 | Phelps | Mar. 9, 1926 |